United States Patent [19]

Clover

[11] 4,293,190

[45] Oct. 6, 1981

[54] TRANSPARENCY VIEWERS

[75] Inventor: George R. Clover, London, England

[73] Assignee: Oakeridge Management Services B.V., Netherlands

[21] Appl. No.: 43,620

[22] Filed: May 30, 1979

[30] Foreign Application Priority Data

May 31, 1978 [GB] United Kingdom ............ 25865/78

[51] Int. Cl.³ ............................................. G02B 27/02
[52] U.S. Cl. .................................. 350/241; 350/250; 350/257
[58] Field of Search ................................ 350/235–241, 350/247, 250, 257, 245–246; 40/361–365, 366–367

[56] References Cited

U.S. PATENT DOCUMENTS

| | | | |
|---|---|---|---|
| 533,324 | 1/1895 | Stevens | 350/241 |
| 1,007,760 | 11/1911 | Williams | 350/240 |
| 2,533,628 | 12/1950 | Rosenberg | 350/241 |
| 3,169,332 | 2/1965 | Rosenburgh | 40/364 |
| 4,059,913 | 11/1977 | Garcia | 40/365 |

FOREIGN PATENT DOCUMENTS

| | | | |
|---|---|---|---|
| 1028807 | 4/1958 | Fed. Rep. of Germany | 350/241 |
| 1040813 | 10/1958 | Fed. Rep. of Germany | 350/235 |

*Primary Examiner*—William H. Punter
*Attorney, Agent, or Firm*—Scully, Scott, Murphy & Presser

[57] ABSTRACT

The invention concerns a novel transparency viewer in which transparency images are viewed sequentially by movement of a viewing member rather than by movement of the images. It provides a transparency viewer comprising a screen for mounting an array of transparency images, e.g. in a grid pattern, and a viewing member movable over the array by way of guides for viewing any selected said image of the array. In one type of embodiment transparencies are held firm over the screen and the viewing member can move from transparency to transparency by way of guides mounted on the screen. In one such case, each transparency is located on the screen by an individual carrier module which is engaged (preferably detachably) with the screen to provide in combination with the screen and adjacent like carrier module(s) the guides by way of which the viewing member moves over the transparencies; different size screens may be provided for accepting one or any desired greater number of rows of carrier modules. The viewing member is preferably disengageable from the guides. A preferred viewing member according to the invention comprises a magnifying lens mounted in an upper frame from which supporting legs descend through a lower frame to feet adapted to engage with the guides for the said movement of the viewing member over the array. The viewing member is preferably constructed so as to be erectable from and dismountable back to a more compact form.

8 Claims, 11 Drawing Figures

TRANSPARENCY VIEWERS

This invention relates to transparency viewers and provides such a viewer comprising a screen for mounting an array of transparency images, e.g. in a grid pattern, and a viewing member movable over the array by way of guides for viewing any selected said image of the array.

The screen is usually light-transmitting and preferably acts as a light diffuser.

In one type of embodiment transparencies are held firm over the screen and the viewing member can move from transparency to transparency by way of guides mounted on the screen. In one such case, each transparency is located on the screen by an individual carrier module which is engaged (preferably detachably) with the screen to provide in combination with the screen and adjacent like carrier module(s) the guides by way of which the viewing member moves over the transparencies; different size screens may be provided for accepting one or any desired greater number of rows of carrier modules.

The viewing member is preferably disengageable from the guides. A preferred viewing member according to the invention comprises a magnifying lens mounted in an upper frame from which supporting legs descend through a lower frame to feet adapted to engage with the guides for the said movement of the viewing member over the array. The viewing member is preferably constructed so as to be erectable from and dismountable back to a more compact form.

In another type of embodiment transparencies, which may be reduced, are combined and integrated into a composite viewing programme over which the viewing member moves on its guides. The viewing member may include a magnifying lens, and/or one fixed lens may be provided over each separate image of the composite transparency; the latter lenses may be combined into a single "fly-eye" composite lens. A light source may be incorporated in the device behind the composite transparency.

Embodiments of the invention will now be described by way of example only, with reference to the accompanying drawings in which.

Figure 6:
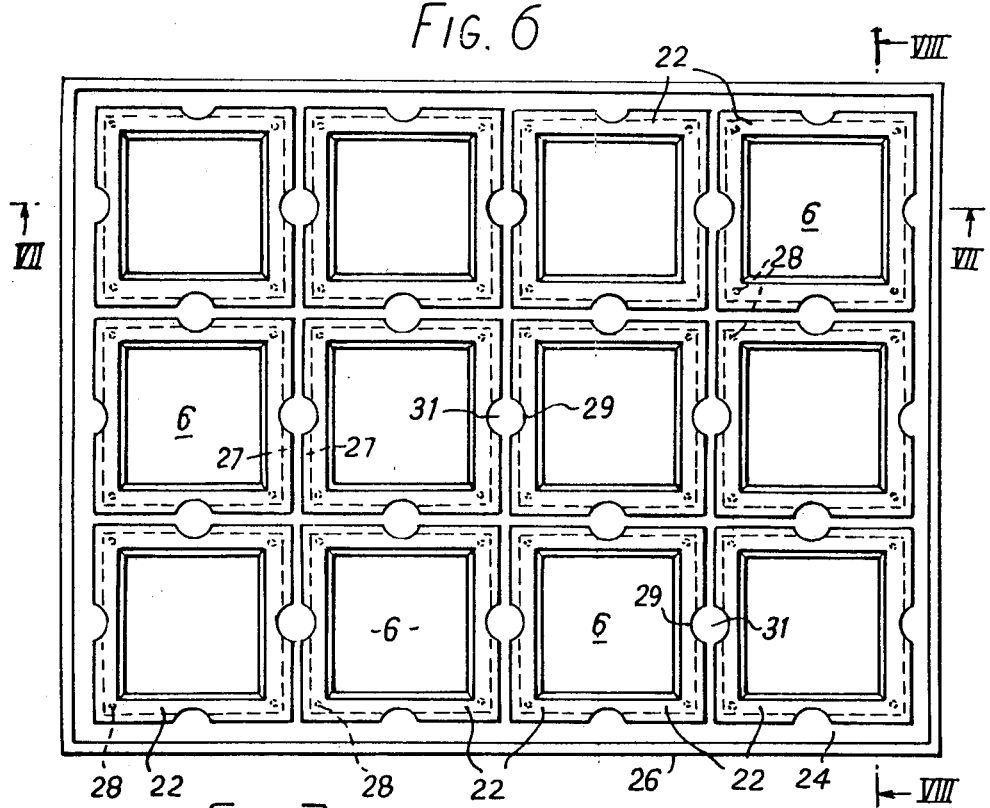
FIG. 6 is a plan view of a preferred screen and guide arrangement for use in the invention.
Figure 7:
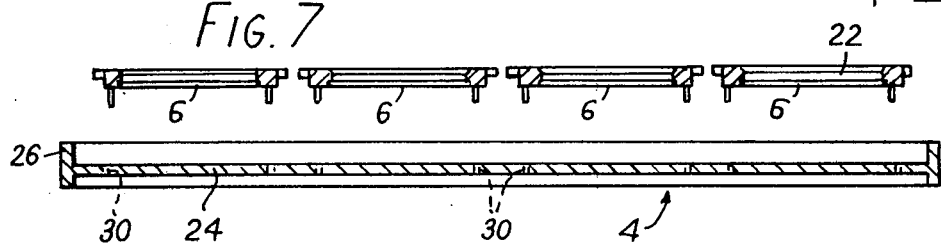
Figure 8:
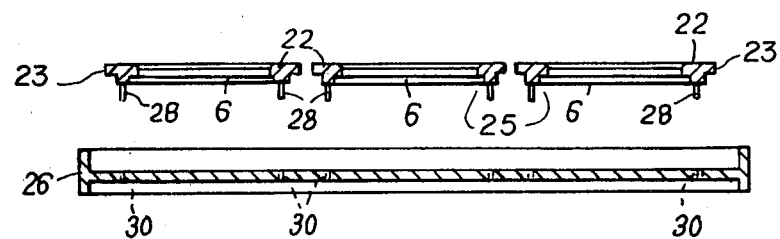
Figure 9:
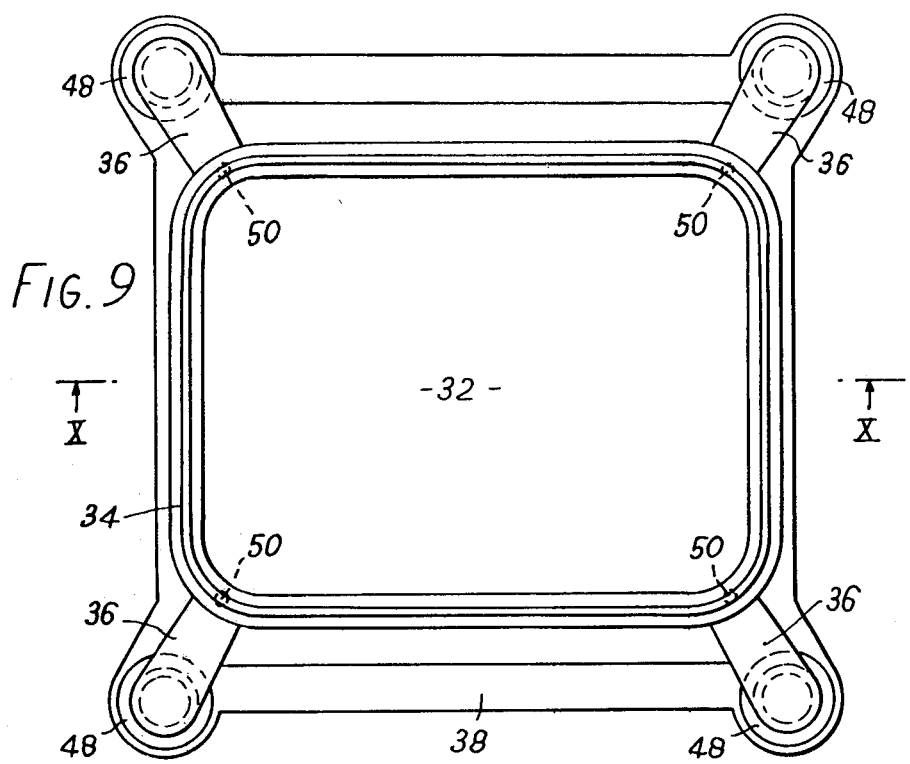

FIGS. 7 and 8 are exploded sectional views taken respectively along lines 7—7 and 8—8 of FIG. 6;

FIG. 9 is a top plan view of a preferred viewing member; and

Figure 5:
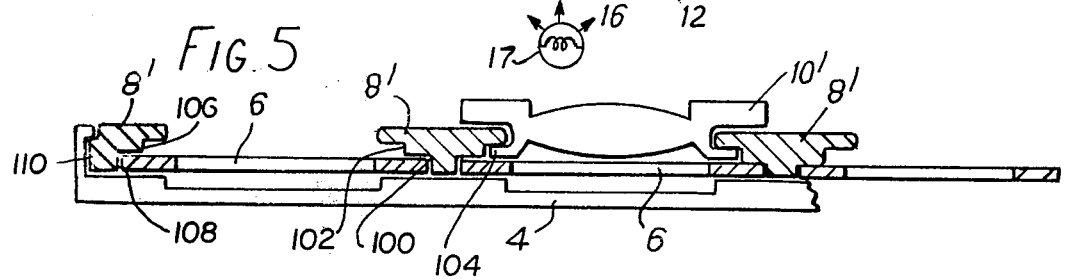
FIG. 5 is a side elevation, in section, of a modification of the viewer of FIGS. 1 and 2 in which a single viewing member capable of covering only a single transparency of the grid at a time is moveable in four directions perpendicular to one another so as to be placeable selectively over any transparency of the grid.
Figure 10:
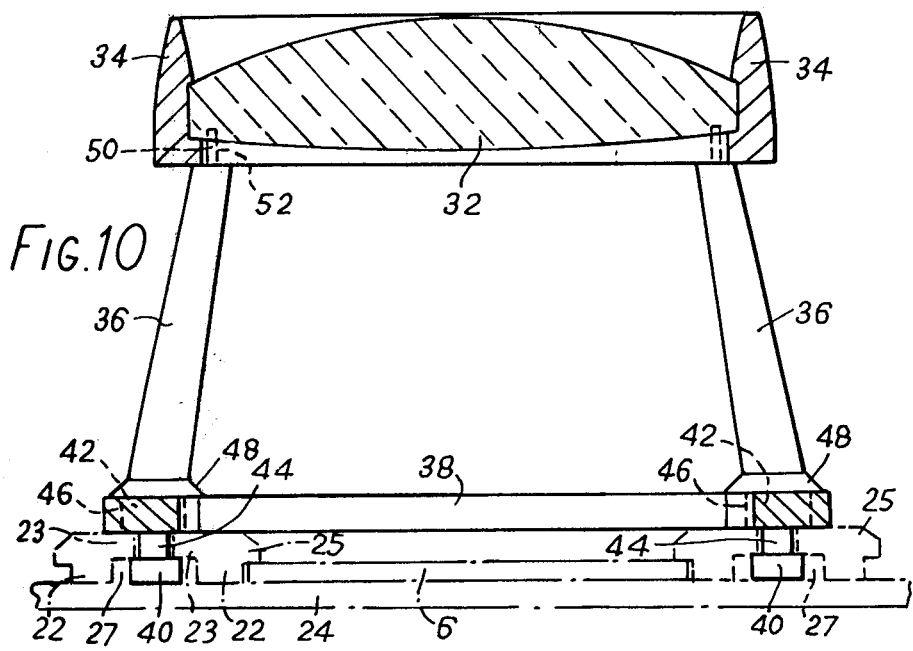
Figure 11:
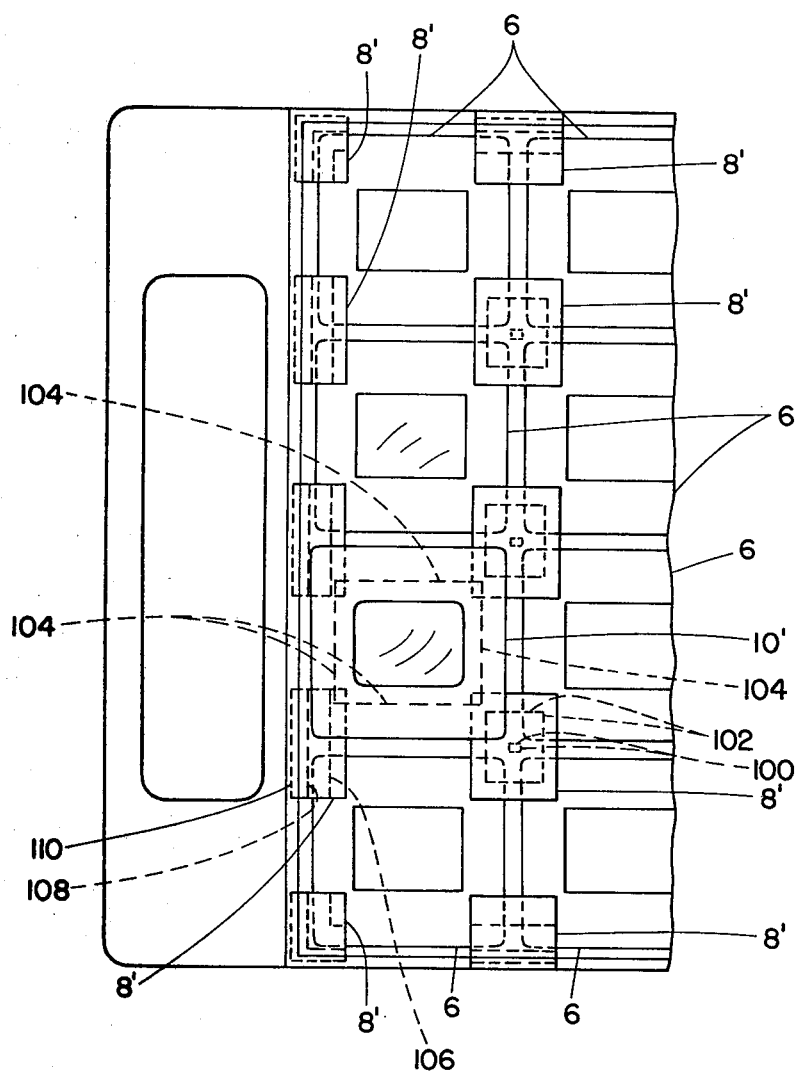

FIG. 10 is an elevation view illustrating the FIG. 9 viewing member in engagement with part of the screen and carrier module combination of FIGS. 6 to 8. FIGS. 9 and 10 are to a larger scale than FIGS. 6 to 8;

FIG. 11 is a plan view of the embodiment illustrated in FIG. 5.

Figure 1:
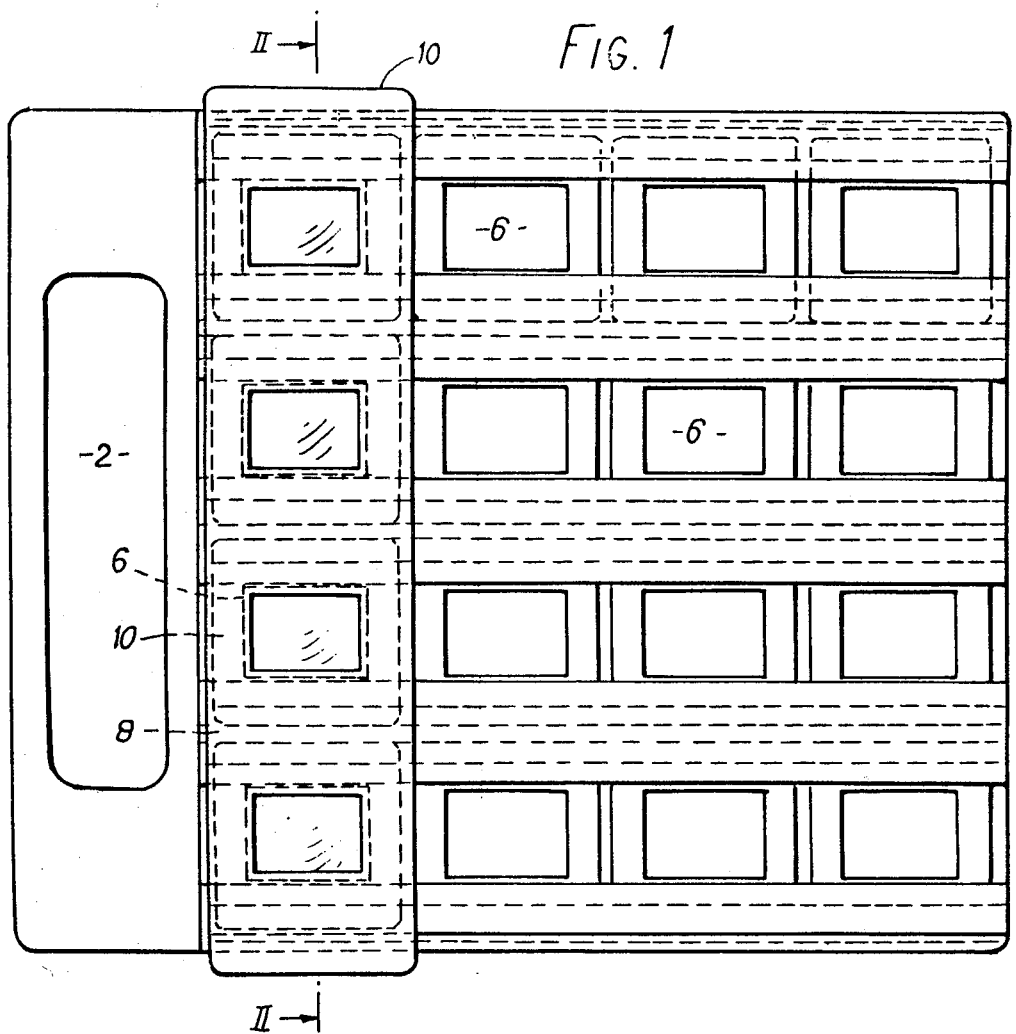
FIG. 1 is a plan view of part of a viewer according to the invention.
Figure 2:
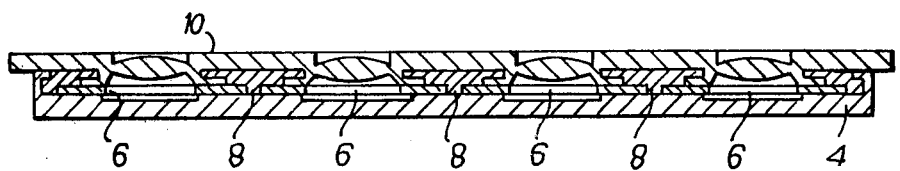
FIG. 2 is a side elevation, in section, of the FIG. 1 viewer including the viewing member.

The viewer shown in FIGS. 1 and 2 is in the form of a flat box which can be held by a handle 2. The base 4 of the box is of translucent material and acts as a light diffusing screen. Transparencies 6 are mounted in a grid array on the base or screen 4 and are held in position by guide members 8 which act as rails on which a viewing member 10 can slide from left to right in FIG. 1. The viewer 10 extends the length of one column or line of transparencies so that when in register with one column or line any transparency in that column or line can be viewed; the viewing member is slid perpendicular to its length along the rails 8 for the viewing of a selected transparency in another column or line. In a less preferred arrangement, a viewing member could be provided which registers over only one transparency at a time, the viewing member being slideable on the rails along the length of one column or line and being removable from the box for transfer from one column or line to another.

Figure 3:
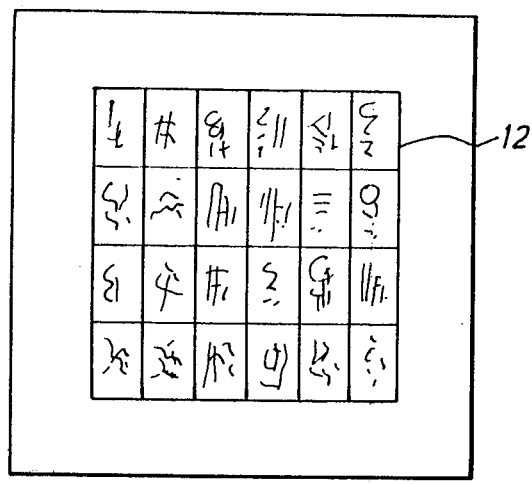
FIG. 3 illustrates a composite multi-image transparency.
Figure 4:
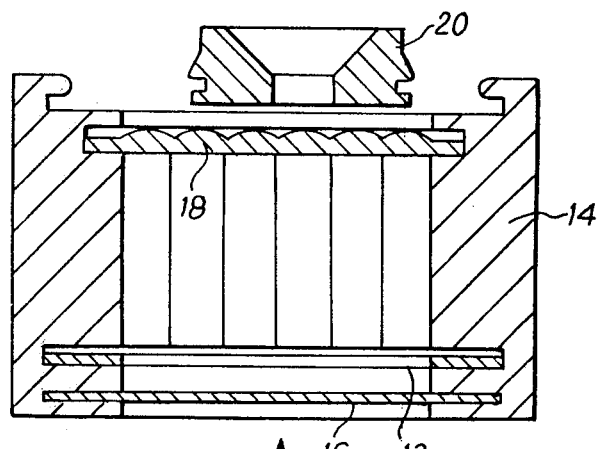
FIG. 4 is a side elevation, in section, of a viewer employing the FIG. 3 transparency.

In the embodiment of FIGS. 3 and 4, the transparencies are reduced and integrated into a composite transparency 12 in which the individual images are again arranged in a grid pattern. The transparency 12 is loaded into a viewer 14 provided with a light diffuser 16, and a composite fly eye lens 18 is mounted in the viewer over the transparency. A moveable eye piece 20 is mounted above the lens for sliding movement over the array for the viewing of any selected individual image of the composite transparency. Instead of the illustrated fixed lens 18, a magnifying lens could be incorporated in the eye piece 20. The viewer can incorporate a light source 17 which would be held behind the light diffuser.

FIG. 5 shows an embodiment which is basically the same as that of FIGS. 1 and 2, except that the guide member rails 8 and viewing member 10 of the latter are replaced respectively by individual guides 8' disposed at the corners of the transparency locations and a single viewing member 10' which can move, guided by guide posts or members 8', from any one transparency to another across and/or up or down the grid. In this embodiment the guides 8' are located at the corners of each transparency location, and the single viewing member may be moved between the guides either vertically along a column of transparency locations or horizontally along a row of the transparencies.

FIG. 11 is a plan view of the embodiment illustrated in FIG. 5 which shows viewing member 10' as it is visible in the plan view, slides 6 as they are visible in the plan view, and also individual guides 8' also as they are visible in the plan view. FIG. 5 has reference numerals 100, 102, 104, 106, 108 and 110 to illustrate the various edges therein which are also shown in the plan view of FIG. 11. The central guide members 8' are located in place by lower projections 100. Undercuts 102 in the central guide members provide guide rail surfaces along which the lower outwardly facing surfaces 104 of the viewing member 8' move. The edge guide members 8' have similar guide rail surfaces 106 for guiding movement of the viewing member 8'. The edge surfaces 110 of the edge guide members 8' are recessed under an upper lip of the base 4 to maintain those guide members in position on the viewer.

FIGS. 6 to 8 illustrate a different method of mounting the transparencies. Each transparency 6 is located on screen 4, constituted by a light-diffusing base 24 with a surrounding frame 26, by a respective carrier module 22 which is detachably engaged with screen 4 by way of studs 28 which are a snap or push fit in holes 30. In the embodiment illustrated, the base 24 is of a size to accommodate three rows, each of four transparencies 6, but it will be appreciated that different bases can be provided for accommodating one or any larger number of rows each of any number of transparencies.

Each carrier module 22 is in the form of an open generally rectangular frame which has an outwardly projecting flange 23 extending around its external periphery and an inwardly projecting flange 25 extending around its internal periphery; these flanges are spaced from the base of the carrier module so that, when the module is mounted in position on base 24, the edge of the transparency 6 is secured between flange 25 and the base, and flange 23 defines together with base 24 and the flanges 23 of adjacent carrier modules (and/or the frame 26 of screen 4) a guide or runway 27 along which the feet of a viewing member can slide (see FIG. 10). In the outer periphery of each module 22 a recess 29 is formed midway along each side, the opposing recesses of adjacent modules or a recess and the adjacent frame 26 of screen 4, cooperating to provide spaces 31 by way of which the feet of a viewing member may be moved into and out of engagement with the guides.

A viewing member suitable for use with the screen and guide arrangement of FIGS. 6 to 8 is illustrated in FIGS. 9 and 10. The viewing member has a magnifying lens 32 carried in a frame 34 supported on legs 36 which diverge a little from one another in the direction away from frame 34. Legs 36 pass through a lower open rectangular frame 38 which secures them in postion. Each leg 36 is connected to frame 34 by way of a projection 50 which is a push fit in recess 52 in frame 34, and to lower frame 38 by way of a trunk portion 42 which is a push fit through a hole 46 through frame 38, so that the legs and upper and lower frames can be disconnected from one another for easier storage. Lower frame 38 is positioned relative to each leg 36 by abuttment against flange 48. Each leg 36 terminates in a foot 40 which is slimmer than trunk portion 42 and separated therefrom by a neck portion 44. Neck portion 44 is narrower than the gap between adjacent flanges 23 and that between a flange 23 and frame 26; the foot 40 is broader than these gaps, except at the spaces 31 through which it can pass to allow the viewing member to be engaged with or disengaged from the guides 27.

For use, the viewing member is thus assembled from the separate lens carrying upper frame, lower frame, and four legs; the feet of the legs are then passed through corresponding spaces 31 to rest on base 24, and the viewing member can then be slid along the guides 27 across and up and down the grid from transparency to transparency. Each carrier module 22 can preferably be separated from and re-engaged with the base 24 to allow for substitution of transparencies. For easier location of the transparencies on base 24 before securing the carrier modules 22 thereover, the surface of base 24 is preferably formed with shallow recesses in which the transparencies fit.

What is claimed is:

1. A transparency viewer comprising a screen for supporting transparencies, and respective individual carrier modules secured over said screen in an array for retaining such transparencies on said screen in said array, each said carrier module constituting a frame to extend over and around the periphery of a transparency, and adjacent carrier modules defining with one another and with the screen guides along which a viewing member can be slid for registration with any selected transparency in said array.

2. A viewer as claimed in claim 1 wherein said carrier modules are detatchably secured to said screen.

3. A viewer as claimed in claim 1 wherein said carrier modules have recesses in their outer edges providing spaces by way of which a viewing member can be moved into and out of engagement with said guides.

4. A viewer as claimed in claim 1 in combination with a viewing member slideable by way of said guides for registration with any selected transparency in said array.

5. A transparency viewer comprising a screen, mounting means for mounting transparency images on said screen in a two dimensional array having at least two rows and two columns, and fixed guide means extending in a two dimensional array over said screen between the transparency images for guiding the movement of a viewing member along both the rows and columns of said array for viewing a selected image in said array.

6. A transparency viewer as claimed in claim 5, including a viewing member slideable along said fixed guide means along both the rows and columns of said array for registration with a selected transparency.

7. A viewer as claimed in claim 5, including a light source for illuminating said composite transparency.

8. A viewer as claimed in claim 5 or 6, wherein said viewing member incorporates a magnifying lens.

* * * * *